(12) United States Patent
Komine (10) Patent No.: US 8,061,946 B2
(45) Date of Patent: Nov. 22, 2011

(54) THREADED ASSEMBLY COMPRISING INTERNAL THREAD MEMBER, AND EXTERNAL THREAD MEMBER

(75) Inventor: Tsuyoshi Komine, Hyogo (JP)

(73) Assignee: Big Alpha Co., Inc., Hyogo (JP)

( * ) Notice: Subject to any disclaimer, the term of this patent is extended or adjusted under 35 U.S.C. 154(b) by 265 days.

(21) Appl. No.: 10/795,664

(22) Filed: Mar. 8, 2004

(65) Prior Publication Data

US 2006/0140739 A1 Jun. 29, 2006

(30) Foreign Application Priority Data

Oct. 23, 2003 (JP) ................................. 2003-362756

(51) Int. Cl.
*F16B 33/02* (2006.01)
(52) U.S. Cl. .................................................... 411/366.3
(58) Field of Classification Search .......... 411/308–310, 411/366.1, 366.3, 411, 436, 423
See application file for complete search history.

(56) References Cited

U.S. PATENT DOCUMENTS

| | | | | |
|---|---|---|---|---|
| 138,277 | A * | 4/1873 | Peet | 411/436 |
| 658,085 | A * | 9/1900 | Higbee | 411/436 |
| 2,336,570 | A * | 12/1943 | Rabezzana | 123/169 PH |
| 2,349,651 | A | 5/1944 | Davis | |
| 3,394,626 | A * | 7/1968 | Oliver | 411/411 |
| 3,707,107 | A | 12/1972 | Bieri | |
| 4,237,948 | A | 12/1980 | Jones et al. | |
| 4,258,768 | A * | 3/1981 | Pamer et al. | 152/176 |
| 4,907,926 | A * | 3/1990 | Wing | 411/366.3 |
| 4,915,559 | A * | 4/1990 | Wheeler et al. | 411/366.3 |
| 4,958,973 | A * | 9/1990 | Sugimura | 411/423 |
| 5,221,113 | A | 6/1993 | Stoll et al. | |
| 5,413,445 | A * | 5/1995 | Cartellone | 411/400 |
| 5,429,459 | A | 7/1995 | Palm et al. | |
| 6,726,420 | B2 * | 4/2004 | Ward et al. | 411/436 |

FOREIGN PATENT DOCUMENTS

| | | |
|---|---|---|
| FR | 2452346 A1 | 10/1980 |
| JP | S37-31927 Y | 12/1937 |
| JP | S45-12615 B | 5/1970 |
| JP | 49-058263 A | 6/1974 |
| JP | 61-157716 A1 * | 9/1986 |
| JP | 1-146206 A1 * | 10/1989 |
| JP | 11-025619 A1 * | 1/1999 |
| JP | 2002-330976 A1 * | 11/2002 |
| JP | 2002-364620 A | 12/2002 |
| JP | 2003-097531 A1 * | 4/2003 |
| JP | 2004-084789 A1 * | 3/2004 |
| JP | 2004-332750 A1 * | 11/2004 |

(Continued)

OTHER PUBLICATIONS

The Japanese Society of Mechanical Engineers, "International Guide to Machine Elements".

(Continued)

*Primary Examiner* — Flemming Saether
(74) *Attorney, Agent, or Firm* — Posz Law Group, PLC (57) ABSTRACT

The present invention provides an internal thread member and an external thread member that can achieve stable finishing accuracy, can assure a desirable thread overlap, and have sufficient breaking strength and pullout strength. This invention also provides a cutter which can machine internal threads with stable finishing accuracy and can assure improved durability.

1 Claim, 6 Drawing Sheets

FOREIGN PATENT DOCUMENTS

JP         2005-042848 A      2/2005

OTHER PUBLICATIONS

Japanese Industrial Standards.

Anonymous, *Information on Screw Threads: British Association Thread*, Internet Article published Dec. 31, 1999 and retrieved Jan. 25, 2005 from Internet: URL:http://www.boltscience.com/pages/screw5.htm.

Notice of Reasons for Refusal, of the Japanese Patent Office on May 6, 2005 in Japanese Patent Application No. 2003-362756.

Notice of Reasons for Refusal, of the Japanese Patent Office on Oct. 14, 2005 in Japanese Patent Application No. 2003-362756.*

JIS B 0225—Cycle Threads, Japanese Industrial Standard, 1960, Publisher: Japanese Standards Association.

JIS B 0205-1—ISO General Purpose Metric Screw Threads-Part 1: Basic Profile, Japanese Industrial Standard, 2001, Publisher: Japanese Standards Association.

JIS B 0216—Metric Trapezoidal Screw Threads, Japanese Industrial Standard, 1987, Publisher: Japanese Standards Association.

JIS B 0201—Miniature Screw Threads, Japanese Industrial Standard, 1973, Publisher: Japanese Standards Association.

JIS B 0202—Parallel Pipe Threads, Japanese Industrial Standard, 1999, Publisher: Japanese Standards Association.

JIS B 0206—Unified Coarse Screw Threads, Japanese Industrial Standard, 1973, Publisher: Japanese Standards Association.

Brooks, Randall C., *Standard Screw Threads for Scientific Instruments*, Part II: The British Association Screw Gauge, History and Technology, vol. 6, pp. 45-59, 1988.

Office Action dated Jan. 23, 2009 in corresponding Taiwan patent application No. 093102212 (and partial English translation).

* cited by examiner

THREADED ASSEMBLY COMPRISING INTERNAL THREAD MEMBER, AND EXTERNAL THREAD MEMBER

CROSS-REFERENCE TO RELATED APPLICATION

This application claims the priority under 35 U.S.C. §119 of Japanese Patent Application No. 2003-362756 filed Oct. 23, 2003.

BACKGROUND

The present invention relates to an internal thread member, an external thread member, and a cutter for machining an internal thread.

As basic screw shapes, the JIS standards have included descriptions of, for example, miniature thread screws, pipe screw threads, metric screw threads, unified screw threads, and cycle threads. Specifically, please refer to JIS B 0201 "Miniature Screw Threads," JIS B 0202 "Parallel Pipe Threads," JIS B 0205 "Metric Coarse Screw Threads," JIS B 0206 "Unified Coarse Screw Threads," JIS B 0216 "Metric Trapezoidal Screw Threads," and JIS B 0225 "Cycle Threads."

Since threads are cut in an external thread along its outside surface, it is easy to machine the external thread. According to the JIS standards, for performance reasons, a rounded root of the external thread is designed to have a large radius, and its height of thread engagement on the external thread side with reference to its pitch diameter that constitutes a part of its thread overlap is smaller than its height of thread engagement on the internal thread side that constitutes the remaining part of the thread overlap.

Concerning metric screw threads and unified screw threads, no specific requirements are established with regard to the rounded roots of their internal threads. However, the height from the top of a fundamental triangle to the top of an external thread root is H/8 (H=($\sqrt{3}$/2) P; where P represents the pitch of the thread). Accordingly, when the pitch is 1 mm, the radius of a rounded root is approximately 0.072 mm, which means that the rounded root is very small. However, cycle threads with rounded roots have the largest radius among various types of screws. In the case of the cycle thread, the radius of the rounded root of an internal thread is one-sixth (⅙) of the pitch. The size of the cycle thread is normally expressed in inches. However, assuming that its pitch is 1 mm, the radius of its rounded root would be approximately 0.16667 mm. Therefore, the thread overlap of the cycle thread would be small.

Cutters such as screw taps, end mill taps (or planet taps), and cutting tools are used to grind and machine internal threads. When machining an internal thread that has a rounded root of a small radius, the tip (or crest) of the cutting edge of the cutter tends to wear out quickly and to easily become chipped or to suffer damage. This tendency is particularly strong when the material for the internal thread is hard. Accordingly, there is a possibility that it may become difficult to secure stable finishing accuracy and the life of the cutter may be shortened.

Moreover, as described above, if the rounded root of the internal thread is designed to have a large radius, its thread overlap becomes small, thereby making it difficult to secure sufficient breaking strength and pullout strength.

SUMMARY OF THE INVENTION

The present invention resolves the above-described conventional problems.

It is an object of this invention to provide an internal thread member and an external thread member that can achieve stable finishing accuracy, can assure a desirable thread overlap, and have sufficient breaking strength and pullout strength.

It is another object of this invention to provide a cutter which can machine internal threads with stable finishing accuracy and can assure improved durability.

In order to achieve the above-mentioned objects, this invention provides an internal thread member having an internal thread that engages with an external thread formed on an external thread member, wherein its height of thread engagement on the external thread side with reference to its pitch diameter is larger than the height of thread engagement on the internal thread side.

Concerning the internal thread having the above-described structure, its height of thread engagement on the external thread side as measured from its pitch diameter (i.e., the length of a flank in the area closer to the inside diameter with reference to the pitch diameter) is larger than its height of thread engagement on the internal thread side as measured from its pitch diameter (i.e., the length of a flank in the area closer to the outside diameter with reference to the pitch diameter). Accordingly, it is possible to make the rounded root of the internal thread with a large radius. Therefore, it is possible to secure stable finishing accuracy. Moreover, by having a large radius for the rounded root of the internal thread, the diameter of the internal thread at its thread roots (i.e., the inside diameter of the internal thread as measured at its thread root position) can be made small. Therefore, it is also possible to reduce the outside diameter of the internal thread. Furthermore, if the height of thread engagement on the internal thread side with reference to the pitch diameter is larger than the height of thread engagement on the external thread side, a contact region of the internal thread with the external thread is positioned closer to the inside diameter side and away from the outside diameter side. Consequently, the area of the contact region becomes smaller and the distance from the center of the threads to a force generating position is shortened, thereby making it possible to reduce the force necessary to turn the threads.

A thread crest of the internal thread of this invention can be in an arc shape that is smoothly connected to both flanks of the internal thread.

Moreover, this invention provides an internal thread member having an internal thread that engages with an external thread formed on an external thread member, wherein when the pitch is 1.5 mm or less, the angle of a thread of the internal thread is in the range of 30 degrees to 55 degrees, and wherein the root of the internal thread is in an arc shape that is smoothly connected to both flanks of the internal thread, and the radius of the arc is 0.15 mm or more.

Concerning the internal thread member having the above-described structure, it is possible to have a large radius for the rounded root of the internal thread, thereby securing stable finishing accuracy. Moreover, it is possible to have a small diameter for the internal thread at its thread root (i.e., the inside diameter of the internal thread as measured at its thread root), thereby making it possible to reduce the outside diameter of the internal thread.

Furthermore, the internal thread member having the above-described structure can be also configured in a manner such that its height of thread engagement on the external thread side with reference to its pitch diameter is larger than the height of thread engagement on the internal thread side. In this case, the contact region of the internal thread with the external thread is positioned closer to the inside diameter side and away from the outside diameter side. Consequently, the area of the contact region becomes smaller and the distance from the center of the threads to a force generating position is shortened, thereby making it possible to reduce the force necessary to turn the threads.

Moreover, the internal thread member of this invention can be configured in a manner such that extension lines of both its flanks intersect with each other.

Furthermore, regarding any internal thread member of this invention, it is possible to set the angle of the thread of the internal thread in the range of 30 degrees to 55 degrees. By setting the angle of the thread in this manner, it is possible to have a large height of thread engagement on the external thread side as measured from the pitch diameter even if the height of thread engagement on the internal thread side as measured from the pitch diameter is small. Accordingly, it is possible to secure a desirable thread overlap of the entire internal thread. Therefore, it is possible to obtain sufficient breaking strength and pullout strength.

This invention also provides an external thread member having an external thread that engages with an internal thread formed on an internal thread member, wherein its height of thread engagement on the external thread side with reference to its pitch diameter is larger than the height of thread engagement on the internal thread side.

Concerning the external thread member having the above-described structure, a contact region of the external thread with the internal thread is positioned closer to the inside diameter side and away from the outside diameter side. Consequently, the area of the contact region becomes smaller and the distance from the center of the threads to a force generating position is shortened, thereby making it possible to reduce the force necessary to turn the threads.

The external thread member of this invention can be configured in a manner such that extension lines of both flanks of the external thread intersect with each other.

Concerning the external thread member of this invention, it is possible to set the angle of its thread in the range of 30 degrees to 55 degrees. By setting the angle of the thread in this manner, it is possible to have a large height of thread engagement on the external thread side as measured from the pitch diameter even if the height of thread engagement on the internal thread side as measured from the pitch diameter is small. Accordingly, it is possible to secure a desirable thread overlap of the entire external thread. Therefore, it is possible to obtain sufficient breaking strength and pullout strength.

Moreover, this invention provides an external thread member that engages with the above-described internal thread member, wherein the external thread member comprises flanks that engage with the flanks of the internal thread.

Concerning the external thread member having the above-described structure, its thread crest engages with the large rounded root of the internal thread. Accordingly, it is possible to form the top of the thread crest in a comparatively flat shape (that is a shape with no sharp edge). Therefore, the safety is assured even if the top of the thread edge is exposed.

Moreover, this invention provides a cutter for machining the internal thread of the above-described internal thread member, wherein the cutter comprises: a thread crest in the shape complementary to the shape of the thread root of the internal thread; and flanks in the shape complementary to the shape of the flanks of the internal thread.

Since this cutter has a comparatively large arc (in the shape complementary to that of the thread root of the internal thread) at the top of the thread crest, it is possible to improve the fracture resistance and the wear and abrasion resistance.

In the case of the cutter for machining the internal thread with the angle of the thread in the range of 30 degrees to 55 degrees, it is possible to secure a much larger thread overlap of the entire thread.

The internal thread or the external thread, or both of them are made of steel. When thermal treatment is applied to this steel in order to enhance hardness, it is possible to assure good accuracy with regard to the shapes of the threads and the roughness by using a cutter, which is made of a sintered material, for machining the threads after the thermal treatment in order to avoid any deformation of the threads due to the thermal treatment.

Moreover, if an internal thread of a clamp nut is machined after hardening the steel in order to enhance hardness, as compared to the case where the thermal treatment is applied after machining the thread, the run-out accuracy and the roughness of the thread will be further improved, the clamp nut will be attached to a tool holder body with better accuracy, and the mounting accuracy of the cutter to be held will also be further improved.

The shapes of the above-described internal thread and external thread are basic shapes, and may sometimes depart form such basic shapes due to machining tolerance or the shapes to be formed.

Since the rounded root of the internal thread member of this invention can have a large radius, it is possible to obtain stable finishing accuracy. Moreover, since it is possible for the rounded root of the internal thread to have a large radius, the diameter of the internal thread at the thread root position can be reduced. Accordingly, it is also possible to reduce the outside diameter of the internal thread. Furthermore, when its height of thread engagement on the external thread side with reference to the pitch diameter is larger than the height of thread engagement on the internal thread side, the contact region of the internal thread with the external thread is positioned closer to the inside diameter side and away from the outside diameter side. Consequently, the area of the contact region becomes smaller and the distance from the center of the threads to a force generating position is shortened, thereby making it possible to reduce the force necessary to turn the threads.

Moreover, concerning the external thread member of this invention, the contact region of the external thread with the internal thread is positioned closer to the inside diameter side and away from the outside diameter side. Consequently, the area of the contact region of the external thread with the internal thread becomes smaller and the distance from the center of the threads to a force generating position is shortened, thereby making it possible to reduce the force necessary to turn the threads. Since it is also possible to form the top of the thread crest in a comparatively flat shape, the safety is assured even if the top of the thread crest is exposed.

Furthermore, since the cutter for machining the internal thread of this invention comprises a comparatively large arc (in the shape complementary to that of the thread root of the internal thread) at the top of its thread crest, it is possible to enhance the fracture resistance and the wear and abrasion resistance. Accordingly, it is possible to improve the finishing accuracy and to assure the long life.

DETAILED DESCRIPTION OF THE INVENTION, AND PREFERRED EMBODIMENTS THEREOF

The internal thread member, the external thread member, and the cutter for machining the internal thread according to preferred embodiments of this invention are described below.

The following embodiments are indicated merely for purposes of illustration to explain the present invention, and this invention is not limited to these embodiments. Accordingly, this invention can be practiced in various manners as long as such manners of practice would not depart from the gist of this invention.

Embodiment 1

Figure 1:
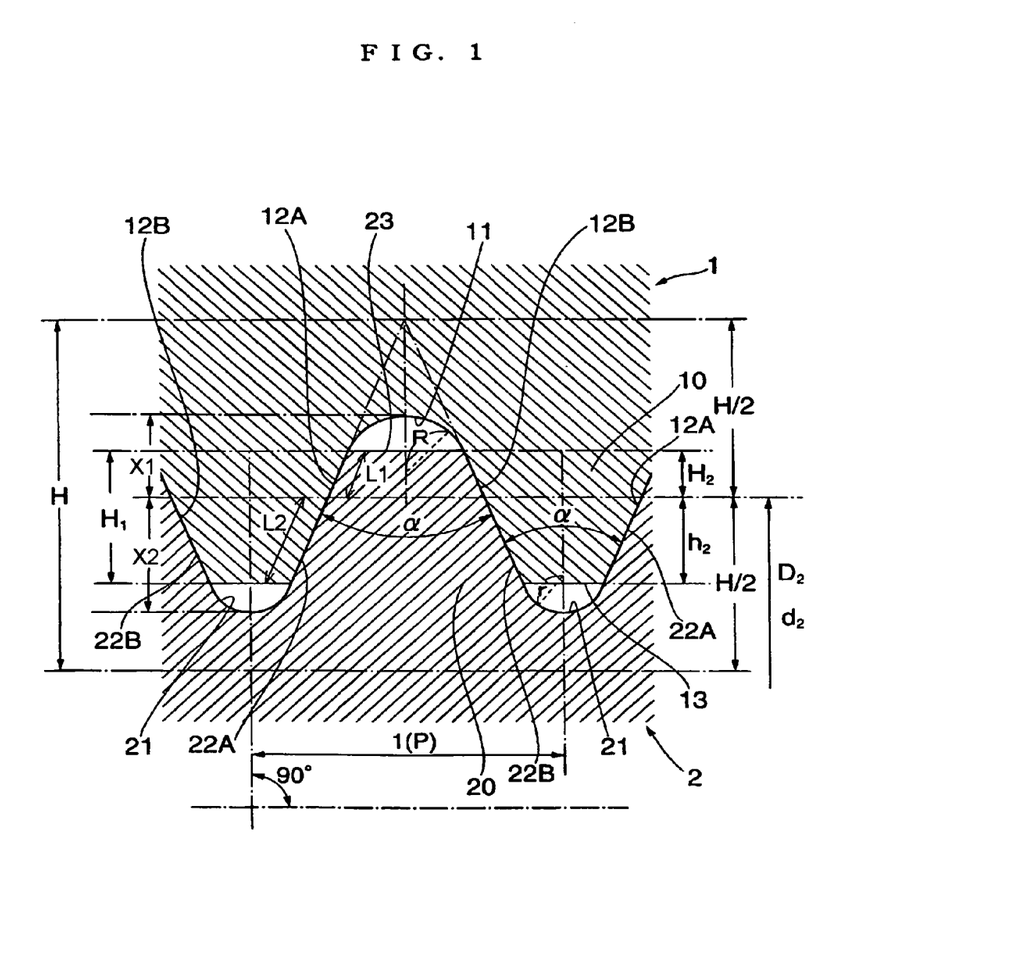
FIG. 1 is a sectional view that illustrates a part of an internal thread member and an external thread member according to Embodiment 1 of this invention in the state where the internal thread member engages with the external thread member.

FIG. 1 is a sectional view that illustrates a part of an internal thread member and an external thread member according to Embodiment 1 of this invention in the state where the internal thread member engages with the external thread member.

As shown in FIG. 1, an internal thread member 1 of Embodiment 1 has an internal thread 10 formed around its inside surface. Concerning this internal thread 10, the pitch (P) is 1 mm, the angle ($\alpha$) of a thread is 45 degrees, and extension lines of both its flanks 12A and 12B intersect with each other. A thread root 11 of the internal thread 10 consists of an arc (radius (R)=0.2 mm) that is smoothly connected to both the flanks 12A and 12B. A thread crest 13 of the internal thread 10 is shaped as a flat plane positioned close to the ends of an arc (radius (r)=0.125 mm) that forms a thread root 21 of an external thread 20 described below. This internal thread 10 is structured in such a manner that its height of thread engagement ($h_2$) on the external thread side with reference to its pitch diameter ($D_2$) is larger than its height of thread engagement ($H_2$) on the internal thread side ($h_2 > H_2$; where $h_2 + H_2 = H_1$ [$H_1$ is a thread overlap of the entire internal thread 10]).

As shown in FIG. 1, an engaging surface of each flank 12A, 12B of the internal thread 10 is adapted to engage a corresponding flank of the external thread 20. The engaging surface includes a part that is inward of the pitch diameter and a part that is outward of the pitch diameter. As further shown in FIG. 1, the length L1 of the part of the engagement surface that is inward of the pitch diameter is less than the length L2 of the part of the engagement surface that is outward of the pitch diameter, as measured in a cross sectional plane of the internal thread 10. As further shown in FIG. 1, the length X1 from the innermost point of the root 11 of the internal thread 10 to the pitch diameter is less than the length X2 from the innermost point of the root of the external thread 20 to the pitch diameter, as measured in a radial direction of the internal thread member 1.

Since the internal thread 10 with the rounded thread root 11 has a large radius (R) as described above, the cutting edge of a cutter should have a large radius (R) and will endure with less wear and fractures, and stable machining can be performed.

However, as shown in FIG. 1, an external thread member 2 of Embodiment 1 has an external thread 20 formed around its outside surface. Concerning this external thread 20, the pitch (P) is 1 mm, the angle ($\alpha$) of a thread is 45 degrees, and extension lines of both its flanks 22A and 22B intersect with each other. These flanks 22A and 22B respectively engage with the flanks 12A and 12B of the internal thread 10. A thread root 21 of the external thread 20 consists of an arc (having a radius (r) of 0.125 mm) that is smoothly connected to both the flanks 22A and 22B.

A thread crest 23 of the external thread 20 is shaped as a flat plane positioned close to the ends of the arc that forms the thread root 11 of the internal thread 10. This external thread 20 is structured in such a manner that its height of thread engagement ($h_2$) on the external thread side with reference to its pitch diameter ($d_2$) is larger than its height of thread engagement ($H_2$) on the internal thread side ($h_2 > H_2$; where $h_2 + H_2 = H_1$ [$H_1$ is a thread overlap of the entire external thread 20]).

As shown in FIG. 1, an engaging surface of each flank 22A, 22B of the external thread 20 is adapted to engage a corresponding flank of the internal thread 10. The engaging surface includes a part that is inward of the pitch diameter and a part that is outward of the pitch diameter. As further shown in FIG. 1, the length L1 of the part of the engagement surface that is outward of the pitch diameter is less than the length L2 of the part of the engagement surface that is inward of the pitch diameter, as measured in a cross sectional plane of the external thread 20.

The following description is given with reference to the relevant drawing about the case in which a clamp nut of a tool holder is employed as the internal thread member and a tool holder body is employed as the external thread member, and the internal thread of Embodiment 1 is formed on the clamp nut and the external tread of Embodiment 1 is formed on the tool holder body.

Figure 2:
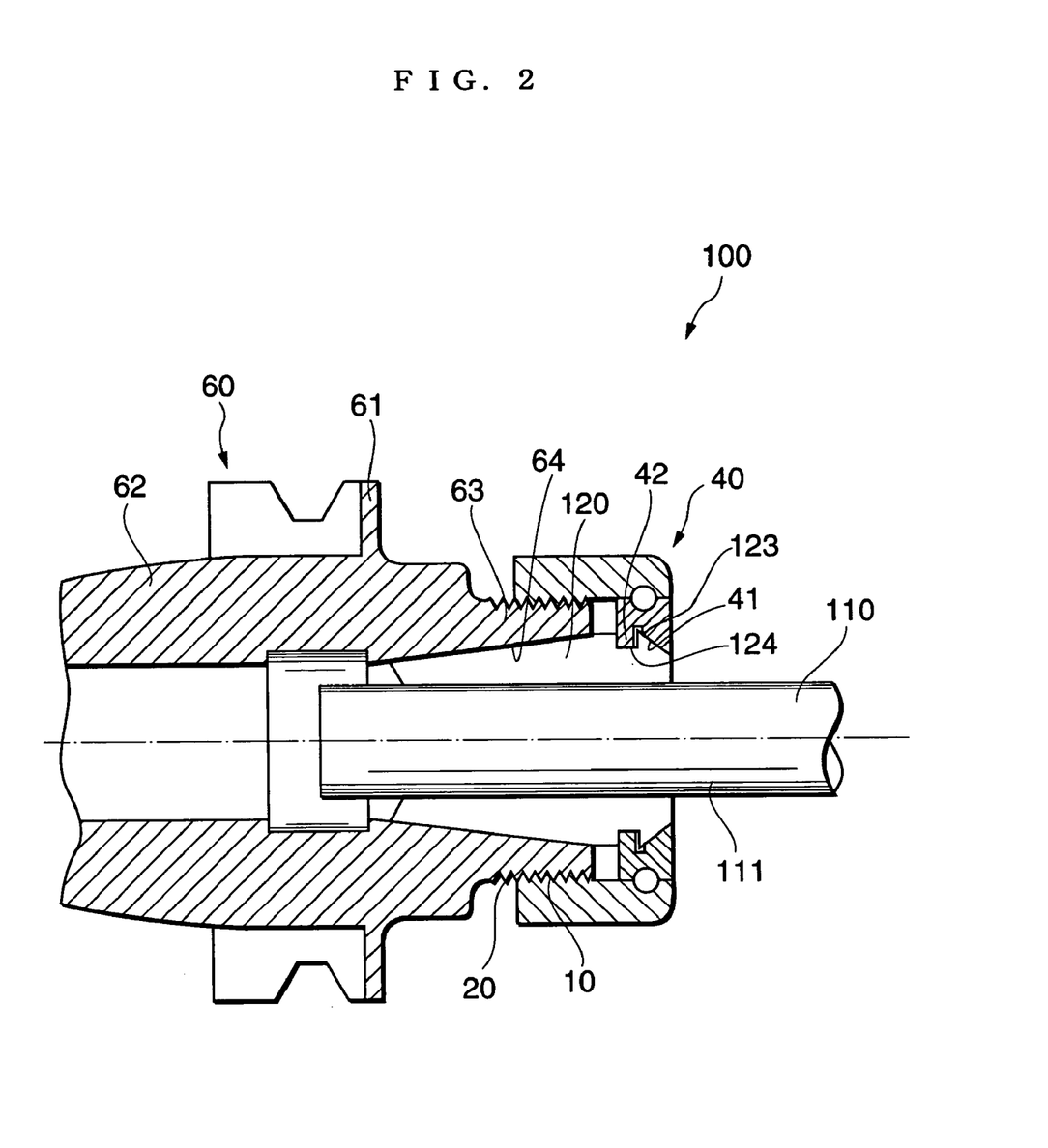
FIG. 2 is a sectional view of the internal thread and the external thread according to Embodiment 1 of this invention in the state where they are applied to a tool holder.

FIG. 2 is a sectional view of a part of a tool holder 100. The tool holder 100 of FIG. 2 comprises: a tool holder body 60 for receiving and holding, together with a collet 120, a shank 111 of a cutter 110 as a tool; and a clamp nut 40 for clamping and fastening the cutter 110 to the tool holder body 60.

The tool holder body 60 comprises: a flange 61 positioned in its midsection; a tapered shank 62 formed on the base-end side of the flange 61; and a cutter-holding part 63 for holding the shank 111 of the cutter 110.

In the cutter-holding part 63, a tapered hole 64 is formed whose diameter gradually becomes smaller from its top-end side to its base-end side. The collet 120 is inserted into this taped hole 64. Around the outside surface of the cutter-holding part 63 on the top-end side, the external thread 20 is formed, which engages with the internal thread 10 formed around the inside surface of the clamp nut 40 as described later in detail. Since the external thread 20 is designed to engage with the large-radius thread root 11 of the internal thread 10 as described above, it is possible to form the top of the thread crest in a comparatively flat shape, and the safety can be assured even if the thread crest is exposed.

The clamp nut 40 has the internal thread 10 which is formed around the inside surface of the clamp nut 40 on the base-end side, and which engages with the external thread 20 formed around the outside surface of the tool holder body 60. Concerning this internal thread 10, the angle ($\alpha$) of the thread is 45 degrees as mentioned above. Accordingly, even if its height of thread engagement on the internal thread side with reference to its pitch diameter ($D_2$) is small, it is possible to obtain a long height of thread engagement ($h_2$) on the external thread side with reference to the pitch diameter ($D_2$) and, therefore, it is possible to secure a sufficient thread overlap ($H_1$) of the entire internal thread. As a result, it is possible to obtain sufficient breaking strength and pullout strength.

Around the inside surface of the clamp nut 40 on the top-end side, a tapered face 41 is formed, whose inside diameter gradually becomes smaller toward the top-end side in a manner complementary to a tapered face 123 of the collet 120. On the base-end side of the tapered face 41, an engaging projection 42, which engages with play with an annular groove 124 of the collet 120, is formed.

Based on the above-described structure, the tool holder body 60 engages with the clamp nut 40, which causes the clamp nut 40 to fasten the collet 120 inserted into the tapered hole 64 and then causes the collet 120 to contract and firmly hold the shank 111 of the cutter 110 mounted within the collet 120. In this situation, if the height of thread engagement ($h_2$) on the external thread side with reference to its pitch diameter ($D_2$ or $d_2$) is larger than the height of thread engagement ($H_2$) on the internal thread side, a contact region of the internal thread 10 with the external thread 20 is positioned closer to the inside diameter side and away from the outside diameter side and away from the inside diameter side. Accordingly, the area of the contact region of the internal thread 10 with the external thread 20 becomes smaller and the distance from the center of the tool holder body 60 (or the clamp nut 40) to a force generating position shortens, thereby making it possible to reduce the force necessary to turn the clamp nut 40 and to easily fasten and secure the cutter 110 to the tool holder 100.

Concerning Embodiment 1, the case in which the pitch of the internal thread 10 and the external thread 20 is 1 mm has been described. However, without limitation to this example, it is possible to set the pitch of the internal thread 10 and the external thread 20 to any value other than 1 mm.

Moreover, regarding Embodiment 1, the case in which the angle ($\alpha$) of the thread of the internal thread 10 and the external thread 20 is 45 degrees has been described. However, without limitation to this example, the angle ($\alpha$) of the thread may be set in the range of 30 degrees to 55 degrees.

Furthermore, regarding Embodiment 1, the case in which the radius of the rounded thread root 11 of the internal thread 10 is 0.2 mm has been described. However, without limitation to this example, the radius of the rounded thread root 11 of the internal thread 10 can be 0.15 mm or more.

Concerning Embodiment 1, the case in which the radius of the rounded thread root 21 of the external thread 20 is 0.125 mm has been described. However, without limitation to this example, the radius of the rounded thread root 21 of the external thread 20 can be determined as desired. For example, in the case of the external thread member having the external thread formed around the outside surface of a cylindrical workpiece whose outside diameter is large, even if the radius of the rounded thread root 21 of the external thread 20 is small to a certain degree, it is possible to secure strength because the entire diameter of the external thread member is large. Accordingly, even when employing the rounded thread root 21 of a small radius, it is possible to secure a large thread overlap.

Furthermore, regarding Embodiment 1, the case in which the clamp nut is employed as the internal thread member and the tool holder body is employed as the external thread member has been described. However, without limitation to this example, the internal thread member of this invention can be applied to various components which have the internal thread formed around their inside surfaces. As a matter of course, the external thread member of this invention can be applied to various components which have the external thread formed around their outside surfaces.

Embodiment 2

A cutter for machining the internal thread of the internal thread member of this invention is described below with reference to the relevant drawings. Concerning Embodiment 2, an explanation is given about the cutter (or screw tap) for machining the internal thread 10 of the internal thread member 1 described in Embodiment 1.

Figure 3:
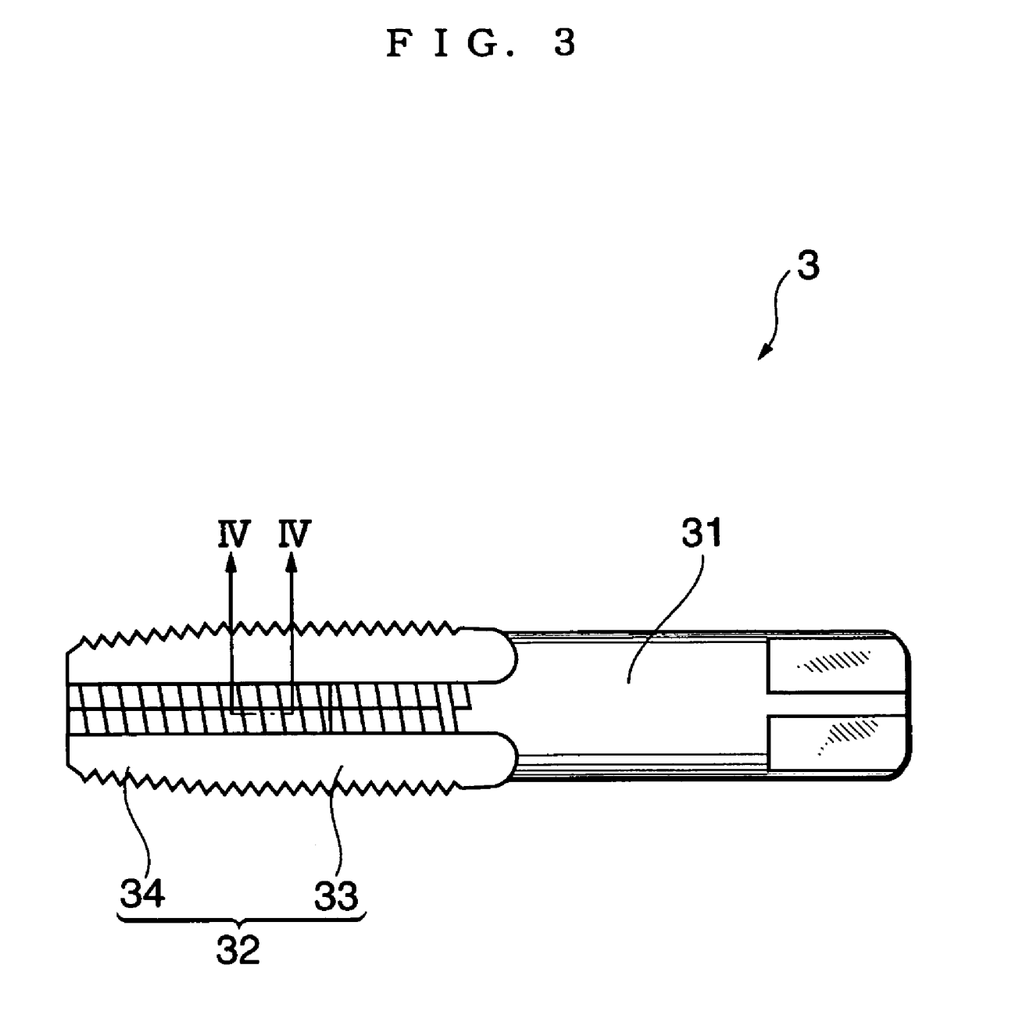
FIG. 3 is a side view of a cutter (screw tap) according to Embodiment 2 of this invention.
Figure 4:
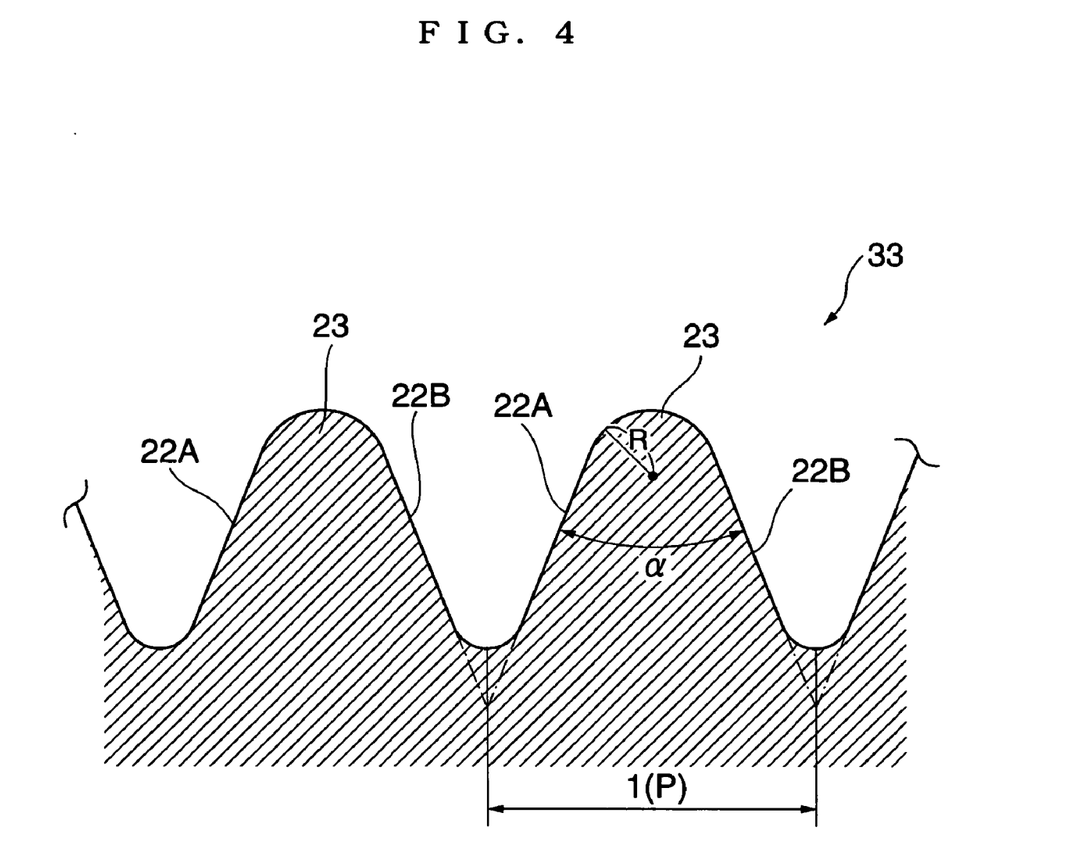
FIG. 4 is an enlarged fragmentary sectional view of the cutter taken along line IV-IV shown in FIG. 3.

FIG. 3 is a side view of the screw tap. FIG. 4 is an enlarged fragmentary sectional view of the screw tap as taken along line IV-IV shown in FIG. 3.

As shown in FIGS. 3 and 4, a screw tap 3 of Embodiment 2 comprises: a shank 31; and a thread unit 32 formed at the top end of the shank 31.

The number of flutes formed in the thread unit 32 is four. The thread unit 32 comprises: a complete thread crest part 33 formed on the shank 31 side; and an chamfer part 34 which is connected to the complete thread crest part 33 and whose outside diameter gradually becomes smaller toward its top-end side.

The complete thread crest part 33 is structured in a manner such that the pitch (P) is 1 mm, the angle ($\alpha$) of the thread is 45 degrees, and extension lines of both its flanks 22A and 22B intersect with each other. A thread crest 23 of the complete thread crest part 33 consists of an arc (radius (R)=0.2 mm) that is smoothly connected to both the flanks 22A and 22B. Specifically, the complete thread crest part 33 comprises: the thread crest 23 in the shape complementary to that of the thread root 11 of the internal thread 10 as described in Embodiment 1; and the flanks 22A and 22B in the shape complementary to that of the flanks 12A and 12B of the internal thread 10.

When machining the internal thread on a workpiece, this screw tap 3 causes the shape of the complete thread crest part 33 to be transferred to the workpiece. Therefore, the internal thread 10 described in Embodiment 1 will be formed on the workpiece.

Concerning Embodiment 2, an explanation has been given about the screw tap 3 for machining the internal thread 10 described in Embodiment 1. However, without limitation to this example, an end mill tap (or planet tap) having a thread unit (cutting unit) to which the shape of the complete thread crest part 33 is applied can also be used to machine the internal thread 10 described in Embodiment 1.

Figure 5:
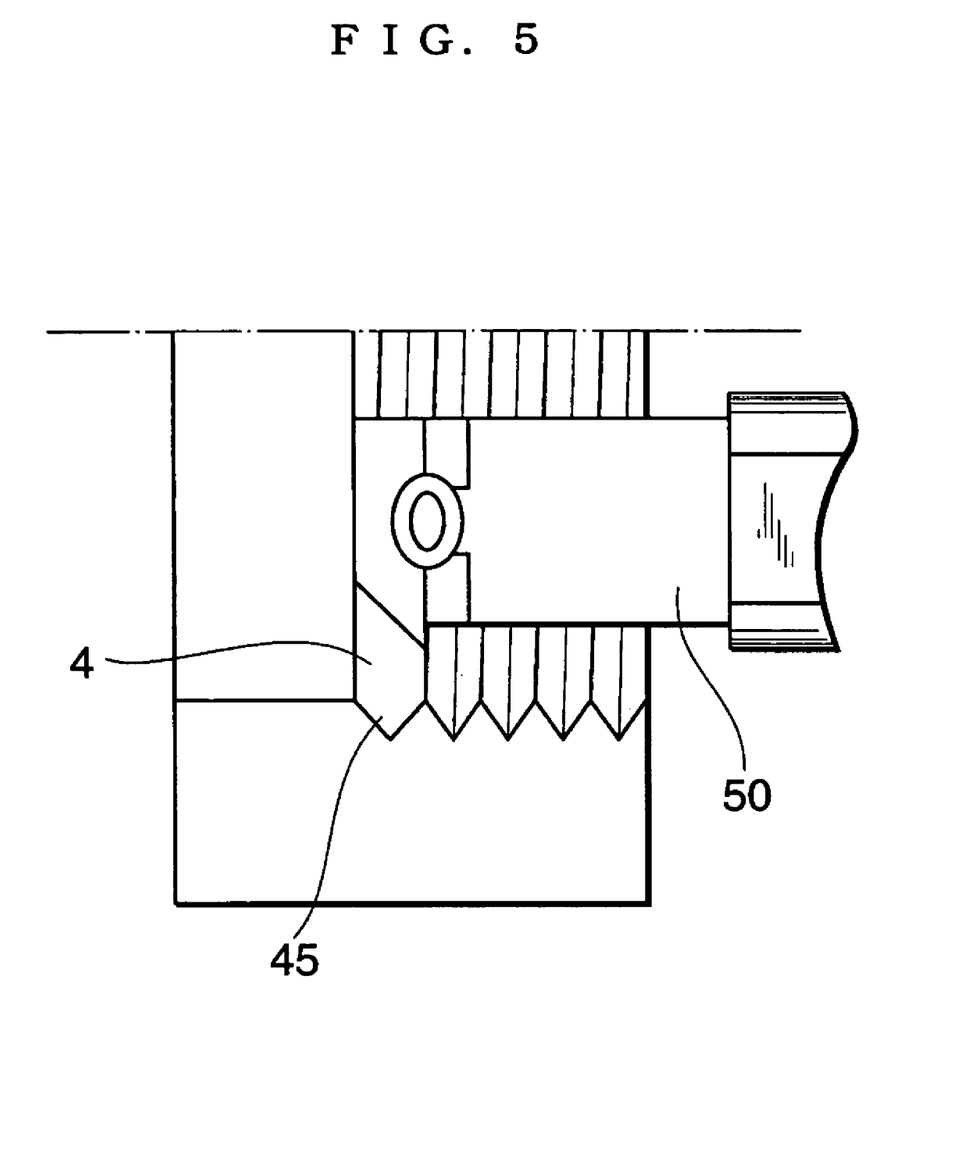
FIG. 5 is a diagrammatic illustration of a cutter according to another embodiment of this invention.
Figure 6:
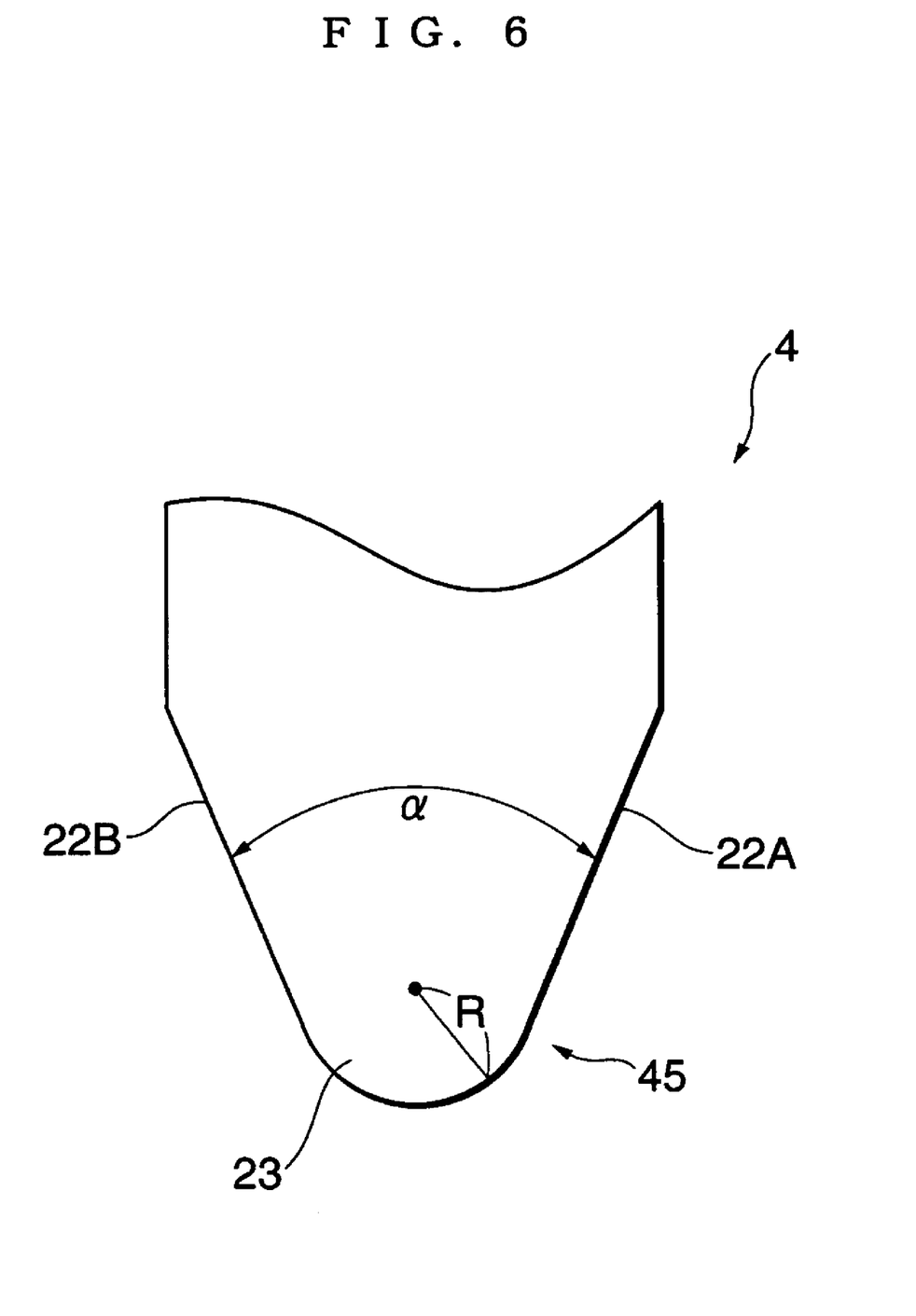
FIG. 6 is a fragmentary sectional view of FIG. 5.

Moreover, the cutter of this invention may be a cutting tool 4 mounted on a holder 50 as shown in FIG. 5. As shown in FIGS. 5 and 6, this cutting tool 4 has a cutting edge 45 whose angle ($\alpha$) is 45 degrees and which has flanks 22A and 22B that taper down to the narrow top of the cutting edge 45. The top of the cutting edge 45 consists of an arc thread crest 23 (radius (R)=0.2 mm) that is smoothly connected to both the flanks 22A and 22B. Specifically, the complete thread crest part 33 comprises: the thread crest 23 in the shape complementary to that of the thread root 11 of the internal thread 10 as described in Embodiment 1; and the flanks 22A and 22B in the shape complementary to that of the flanks 12A and 12B of the internal thread 10.

Concerning Embodiment 2, the cutter for machining the internal thread 10 of Embodiment 1 has been described. However, without limitation to this example, concerning the cutter of this invention, it is possible to select the shape of the thread crest part (cutting edge) as appropriate in accordance with the shape of the internal thread of the internal thread member of this invention.

While the invention has been shown and described herein with reference to various aspects, features and illustrative embodiments, it will be appreciated that the utility of the invention is not thus limited, but rather extends to and encompasses other variations, modifications and alternative embodiments, as will be apparent to those skilled in the art, based on the disclosure herein. Accordingly, all such other variations, modifications and alternative embodiments are to be regarded as being within the spirit and scope of the claims as hereinafter set forth.

I claim:

1. A pair of threaded members comprising:

an internally threaded member and an externally threaded member, wherein the internally threaded member includes a thread formed on an internal surface thereof having a continuous uniform profile, an internal crest and an internal root, and wherein the external threaded member includes a thread formed on an external surface thereof having a continuous, uniform profile, an external crest and an external root;

a pair of flanks, which extend in a straight line between the internal root and the internal crest on opposite sides of the internal thread, respectively, when viewed in a cross-sectional plane of the internally threaded member, and a pair of flanks, which extend in a straight line between the external root and the external crest on opposite sides of the external thread, respectively, when viewed in a cross-sectional plane of the externally threaded member, wherein, with the internally threaded member and the externally threaded member screwed to each other, a pitch diameter is defined as the diameter of an imaginary cylinder where the thickness of the thread equals the gap between adjacent turns of the thread as viewed in the traverse direction, wherein the imaginary cylinder is coaxial with the internally threaded member and the externally threaded member, and wherein the pitch diameter of the internally threaded member is substantially the same as the pitch diameter of the externally threaded member, engaging surfaces of the flanks of the internally threaded member face and engage corresponding surfaces of the flanks of the externally threaded member, respectively, each engaging surface has an inner engaging portion, which extends from the internal root to the pitch diameter and an outer engaging portion, which extends from the pitch diameter to the internal crest, as measured in the cross-sectional plane of the internally threaded member, and a length of each inner engaging portion is less than a length of each outer engaging portion, as measured in the cross-sectional plane of the internally threaded member.

* * * * *